(12) United States Patent
Yu et al.

(10) Patent No.: US 11,010,920 B2
(45) Date of Patent: May 18, 2021

(54) METHOD, SYSTEM AND APPARATUS FOR OBJECT DETECTION IN POINT CLOUDS

(71) Applicant: Zebra Technologies Corporation, Lincolnshire, IL (US)

(72) Inventors: Yuanhao Yu, Mississauga (CA); Raymond Phan, Mississauga (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/153,064

(22) Filed: Oct. 5, 2018

(65) Prior Publication Data
US 2020/0111228 A1 Apr. 9, 2020

(51) Int. Cl.
| | |
|---|---|
| *G06T 7/73* | (2017.01) |
| *G06Q 10/08* | (2012.01) |
| *G06K 9/20* | (2006.01) |
| *G06T 7/13* | (2017.01) |
| *G06T 7/50* | (2017.01) |

(52) U.S. Cl.
CPC ............. *G06T 7/73* (2017.01); *G06K 9/2054* (2013.01); *G06Q 10/087* (2013.01); *G06T 7/13* (2017.01); *G06T 7/50* (2017.01); *G06T 2207/10028* (2013.01); *G06T 2207/20021* (2013.01); *G06T 2207/20221* (2013.01)

(58) Field of Classification Search
CPC ...... G06Q 10/087; G06T 7/50; G06T 2207/10028; G06T 2207/20221; G06T 2207/20021; G06T 7/73; G06T 7/13; G06T 7/0008; G06K 9/2054; G06K 9/3241; G06K 9/00664; G06K 9/00201

USPC .................................................. 382/154, 103
See application file for complete search history.

(56) References Cited

U.S. PATENT DOCUMENTS

| | | | |
|---|---|---|---|
| 5,209,712 A | 5/1993 | Ferri | |
| 5,214,615 A | 5/1993 | Bauer | |
| 5,408,322 A | 4/1995 | Hsu et al. | |
| 5,414,268 A | 5/1995 | McGee | |

(Continued)

FOREIGN PATENT DOCUMENTS

| | | |
|---|---|---|
| CA | 2835830 | 11/2012 |
| CA | 3028156 | 1/2018 |

(Continued)

OTHER PUBLICATIONS

Cleveland, Jonas, et al. "Automated system for semantic object labeling with soft-object recognition and dynamic programming segmentation." IEEE Transactions on Automation Science and Engineering 14.2 (2016): 820-833. (Year: 2016).*

(Continued)

*Primary Examiner* — Geoffrey E Summers

(57) ABSTRACT

A method of detecting objects on a support structure includes: obtaining a point cloud of the support structure supporting an object; obtaining a position of a back of the support structure in the point cloud; discarding a portion of the point cloud based on the position of the back of the support structure; generating a three-dimensional occupancy grid from the point cloud, the occupancy grid having a plurality of cells each indicating whether the cell is one of occupied and unoccupied; identifying a contiguous region of occupied cells in the occupancy grid corresponding to the object; and generating a detected object position based on the contiguous region.

18 Claims, 11 Drawing Sheets

(56) References Cited

U.S. PATENT DOCUMENTS

| | | |
|---|---|---|
| 5,534,762 A | 7/1996 | Kim |
| 5,566,280 A | 10/1996 | Fukui et al. |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,037,396 B2 | 5/2015 | Pack et al. |
| 9,064,394 B1 | 6/2015 | Trundle |
| 9,070,285 B1 | 6/2015 | Ramu et al. |
| 9,129,277 B2 | 9/2015 | Macintosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Halata |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 9,996,818 B1 * | 6/2018 | Ren ................... G06F 16/5866 |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0131278 A1 | 7/2004 | imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |

(56) References Cited

U.S. PATENT DOCUMENTS

| | | |
|---|---|---|
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1* | 1/2010 | Beniyama .......... G06K 9/00201 707/E17.016 |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0241289 A1 | 9/2010 | Sandberg |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | VolKmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0063707 A1* | 3/2015 | Fu .............................. G06T 7/13 382/199 |
| 2015/0088618 A1 | 3/2015 | Basir et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0352721 A1 | 12/2015 | Wicks et al. |
| 2015/0363625 A1 | 12/2015 | Wu et al. |

(56) References Cited

U.S. PATENT DOCUMENTS

| | | |
|---|---|---|
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0260054 A1 | 9/2016 | High et al. |
| 2016/0271795 A1 | 9/2016 | Vicenti |
| 2016/0313133 A1 | 10/2016 | Zeng et al. |
| 2016/0328618 A1 | 11/2016 | Patel et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0109940 A1 | 4/2017 | Guo et al. |
| 2017/0150129 A1 | 5/2017 | Pangrazio |
| 2017/0178060 A1 | 6/2017 | Schwartz |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0101813 A1 | 4/2018 | Paat et al. |
| 2018/0108134 A1* | 4/2018 | Venable .......... G06T 7/251 |
| 2018/0114183 A1 | 4/2018 | Howell |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0201423 A1 | 7/2018 | Drzewiecki et al. |
| 2018/0204111 A1 | 7/2018 | Zadeh et al. |
| 2018/0251253 A1 | 9/2018 | Taira et al. |
| 2018/0281191 A1 | 10/2018 | Sinyayskiy et al. |
| 2018/0293442 A1 | 10/2018 | Fridental et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0370727 A1 | 12/2018 | Hance et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0077015 A1 | 3/2019 | Shibasaki et al. |
| 2019/0087663 A1 | 3/2019 | Yamazaki et al. |
| 2019/0108606 A1 | 4/2019 | Komiyama |
| 2019/0180150 A1 | 6/2019 | Taylor et al. |
| 2019/0197728 A1* | 6/2019 | Yamao .......... G06K 9/6203 |
| 2019/0236530 A1 | 8/2019 | Cantrell et al. |
| 2019/0304132 A1 | 10/2019 | Yoda et al. |
| 2019/0392212 A1 | 12/2019 | Sawhney et al. |

FOREIGN PATENT DOCUMENTS

| | | | |
|---|---|---|---|
| CN | 104200086 | 12/2014 | |
| CN | 107067382 | 8/2017 | |
| EP | 766098 | 4/1997 | |
| EP | 1311993 | 5/2007 | |
| EP | 2309378 | 4/2011 | |
| EP | 2439487 | 4/2012 | |
| EP | 2472475 | 7/2012 | |
| EP | 2562688 | 2/2013 | |
| EP | 2662831 | 11/2013 | |
| EP | 2693362 | 2/2014 | |
| GB | 2323238 | 9/1998 | |
| GB | 2330265 | 4/1999 | |
| KR | 101234798 | 1/2009 | |
| KR | 1020190031431 | 3/2019 | |
| WO | WO 99/23600 | 5/1999 | |
| WO | WO 2003002935 | 1/2003 | |
| WO | WO 2003025805 | 3/2003 | |
| WO | WO 2006136958 | 12/2006 | |
| WO | WO 2007042251 | 4/2007 | |
| WO | WO 2008057504 | 5/2008 | |
| WO | WO 2008154611 | 12/2008 | |
| WO | WO 2012103199 | 8/2012 | |
| WO | WO 2012103202 | 8/2012 | |
| WO | WO 2012154801 | 11/2012 | |
| WO | WO 2013165674 | 11/2013 | |
| WO | WO 2014066422 | 5/2014 | |
| WO | WO 2014092552 | 6/2014 | |
| WO | WO 2014181323 | 11/2014 | |
| WO | WO 2015127503 | 9/2015 | |
| WO | WO 2016020038 | 2/2016 | |
| WO | WO-2017175312 A1 * | 10/2017 | .......... G06Q 50/28 |
| WO | WO 2018018007 | 1/2018 | |
| WO | WO 2018204308 | 11/2018 | |
| WO | WO 2018204342 | 11/2018 | |
| WO | WO 2019023249 | 1/2019 | |

OTHER PUBLICATIONS

Hornung, Armin, et al. "OctoMap: An efficient probabilistic 3D mapping framework based on octrees." Autonomous robots 34.3 (2013): 189-206. (Year: 2013).*

International Search Report and Written Opinion for International Application No. PCT/US2019/050370 dated Nov. 19, 2019.

Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).

Glassner, "Space Subdivision for Fast Ray Tracing." IEEE Computer Graphics and Applications, 4.10, pp. 15-24, 1984.

Golovinskiy, Aleksey, et al. "Min-Cut based segmentation of point clouds." Computer Vision Workshops (ICCV Workshops), 2009 IEEE 12th International Conference on. IEEE, 2009.

(56) References Cited

OTHER PUBLICATIONS

Hackel et al., "Contour Detection in unstructured 3D point clouds,"IEEE, 2016 Conference on Computer vision and Pattern recognition (CVPR), Jun. 27-30, 2016, pp. 1-9.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCTAJS2019/025859 dated Jul. 3, 2019.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion from International Patent Application No. PCT/US2019/064020 dated Feb. 19, 2020.
International Search Report and Written Opinion for International Patent Application No. PCT/US2013/053212 dated Dec. 1, 2014.
International Search Report and Written Opinion for International Patent Application No. PCT/US2013/070996 dated Apr. 2, 2014.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
Jadhav et al. "Survey on Spatial Domain dynamic template matching technique for scanning linear barcode," International Journal of science and research v 5 n 3, Mar. 2016)(Year: 2016).
Jian Fan et al: "Shelf detection via vanishing point and radial projection", 2014 IEEE International Conference on image processing (ICIP), IEEE, (Oct. 17, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pgs. 583-601 (Jul. 30, 2013).
Lari, Z., et al., "An adaptive approach for segmentation of 3D laser point cloud." International Archives of the Photogrammetry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).

Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 I9, pp. 1-20 (2016).
Norrlof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
"Fair Billing with Automatic Dimensioning" International Inc. pp. 1-4, undated, Copyright Mettler-Toledo.
"Plane Detection in Point Cloud Data" dated Jan. 15, 2020 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Facade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Chen et al. "Improving Octree-Based Occupancy Maps Using Environment Sparsity with Application to Aerial Robot Navigation" Robotics and Automation (ICRA), 2017 IEEE.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing ACM SIGGRAPH Computer Graphics", vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France.

(56) References Cited

OTHER PUBLICATIONS

Douillard, Bertrand, et al. "On the segmentation of 3D Lidar point clouds." Robotics and Automation (ICRA), 2011 IEEE International Conference on IEEE, 2011.
Dubois, M., et al., A comparison of geometric and energy-based point cloud semantic segmentation methods, European Conference on Mobile Robots (ECMR), pp. 88-93, 2527, Sep. 2013.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176- p. 178.
Federico Tombari et al. "Multimodal cue integration through Hypotheses Verification for RGB-D object recognition and 6DOF pose estimation", IEEE International Conference on Robotics and Automation, Jan. 2013.
Notice of allowance for U.S. Appl. No. 15/211103 dated Apr. 5, 2017.
Olson, Clark F., etal. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-.
Park et al., "Autonomous mobile robot navigation using passive rfid in indoor environment," IEEE, Transactions on industrial electronics, vol. 56, issue 7, pp. 2366-2373 (Jul. 2009).
Perveen et al. (an overview of template matching methodologies and its application, International Journal of Research in Computer and Communication Technology, v2n10, oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks,"In IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php.
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Senthilkumaran, et al., "Edge Detection Techniques for Image Segmentation-A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint,"International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference on, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.
Varol Gul et al: "Product placement detection based on image processing", 2014 22nd Signal Processing and Communication Applications Conference (SIU), IEEE, 2014-04-23.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, Pgs. 90-99 (2010).
Zhao Zhou et al.: "An Image contrast Enhancement Algorithm Using Plip-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, pp. 2214-2221.
Fan Zhang et al., "Parallax-tolerant Image Stitching", 2014 Computer Vision Foundation, pp. 4321-4328.
Kaimo Lin et al., "SEAGULL: Seam-guided Local Alignment for Parallax-tolerant Image Stitching", Retrieved on Nov. 16, 2020 [http://publishillinois.edu/visual-modeling-and-analytics/files/2016/08/Seagull.pdf].
Julio Zaragoza et al., "As-Projective-As-Possible Image Stitching with Moving DLT", 2013 Computer Vision Foundation, pp. 2339-2346.

\* cited by examiner

METHOD, SYSTEM AND APPARATUS FOR OBJECT DETECTION IN POINT CLOUDS

BACKGROUND

Environments in which inventories of objects are managed, such as products for purchase in a retail environment, may be complex and fluid. For example, a given environment may contain a wide variety of objects with different attributes (size, shape, price and the like). Further, the placement and quantity of the objects in the environment may change frequently. Still further, imaging conditions such as lighting may be variable both over time and at different locations in the environment. These factors may reduce the accuracy with which such objects can be detected in data captured within the environment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
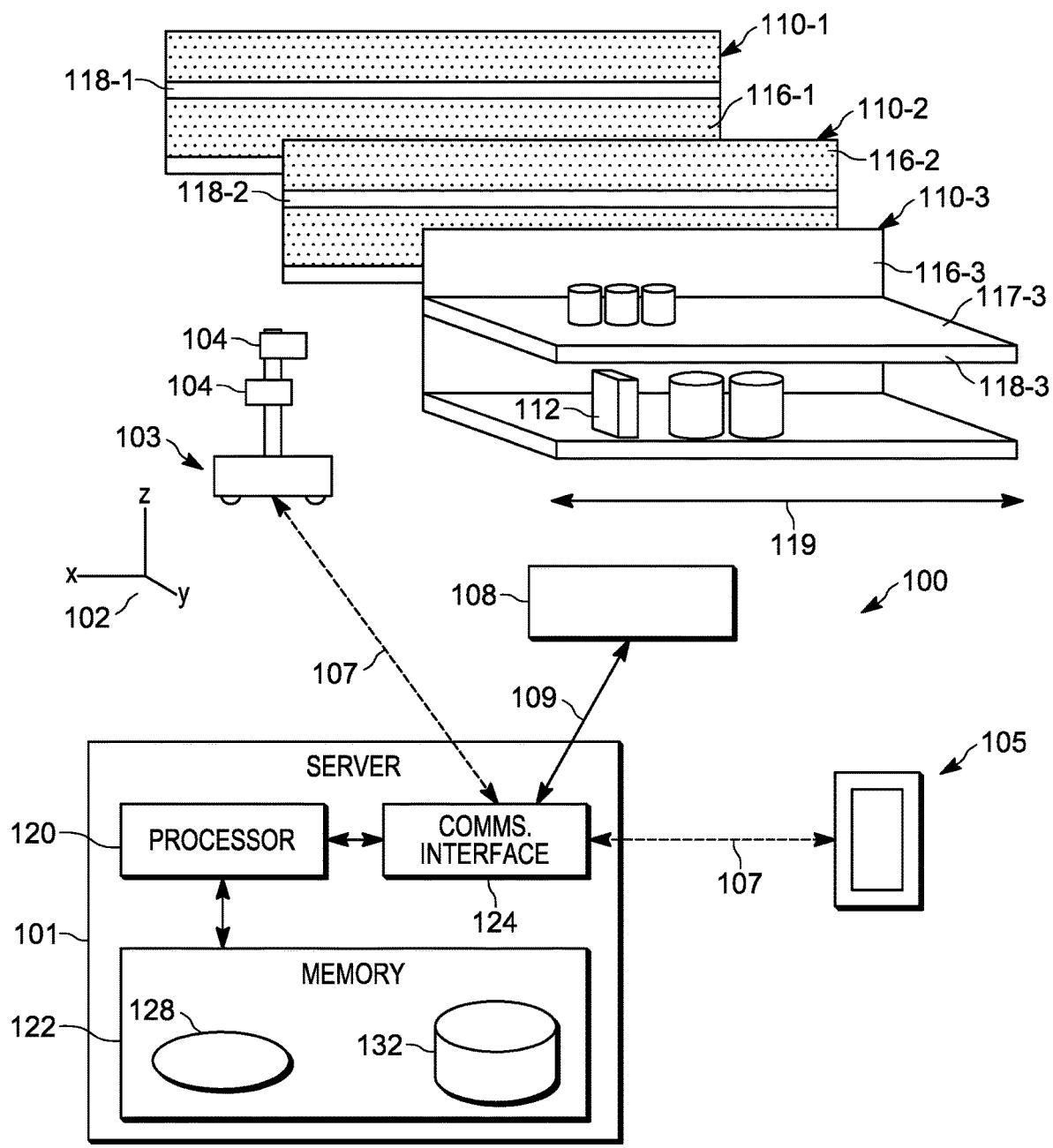
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of detecting objects on a support structure, the method comprising: obtaining a point cloud of the support structure supporting an object; obtaining a position of a back of the support structure in the point cloud; discarding a portion of the point cloud based on the position of the back of the support structure; generating a three-dimensional occupancy grid from the point cloud, the occupancy grid having a plurality of cells each indicating whether the cell is one of occupied and unoccupied; identifying a contiguous region of occupied cells in the occupancy grid corresponding to the object; and generating a detected object position based on the contiguous region.

Additional examples disclosed herein are directed to a computing device for detecting objects on a support structure, comprising: a memory storing (i) a point cloud of the support structure supporting an object, and (ii) a position of a back of the support structure in the point cloud; an imaging controller connected to the memory, the imaging controller configured to: retrieve, from the memory, the point cloud and the position of the back of the support structure in the point cloud; discard a portion of the point cloud based on the position of the back of the support structure; generate a three-dimensional occupancy grid from the point cloud, the occupancy grid having a plurality of cells each indicating whether the cell is one of occupied and unoccupied; identify a contiguous region of occupied cells in the occupancy grid corresponding to the object; and generate a detected object position based on the contiguous region.

Further examples disclosed herein are directed to a non-transitory computer-readable medium storing a plurality of computer-readable instructions executable by a processor of a computing device, wherein execution of the instructions configures the computing device to: obtain a point cloud of a support structure supporting an object; obtain a position of a back of the support structure in the point cloud; discard a portion of the point cloud based on the position of the back of the support structure; generate a three-dimensional occupancy grid from the point cloud, the occupancy grid having a plurality of cells each indicating whether the cell is one of occupied and unoccupied; identify a contiguous region of occupied cells in the occupancy grid corresponding to the object; and generate a detected object position based on the contiguous region.

FIG. 1 depicts a mobile automation system 100 in accordance with the teachings of this disclosure. The system 100 is illustrated as being deployed in a retail environment, but in other embodiments can be deployed in a variety of other environments, including warehouses, hospitals, and the like. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points (not shown). In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 is implemented as another type of computing device, such as a desktop computer, a laptop computer, another server, a kiosk, a monitor, and the like. The system 100 can include a plurality of client devices 105 in communication with the server 101 via respective links 107.

The system 100 is deployed, in the illustrated example, in a retail environment including a plurality of support structures such as shelf modules 110-1, 110-2, 110-3 and so on (collectively referred to as shelves 110, and generically referred to as a shelf 110—this nomenclature is also employed for other elements discussed herein). In other examples, additional types of support structures may also be present, such as pegboards. Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees. The shelf edges 118 define a front of the shelves 110, separated from the shelf backs 116 by a shelf depth. A common frame of reference 102 is illustrated in FIG. 1. In the present example, the shelf depth is defined in the Y dimension of the frame of reference 102, while the shelf backs 116 and shelf edges 118 are shown as being parallel to the XZ plane.

The apparatus 103 is deployed within the retail environment, and communicates with the server 101 (e.g. via the link 107) to navigate, autonomously or partially autonomously, along a length 119 (illustrated in FIG. 1 as being parallel to the X axis of the frame of reference 102) of at least a portion of the shelves 110. The apparatus 103, autonomously or in conjunction with the server 101, is configured to continuously determine its location within the environment, for example with respect to a map of the environment. The apparatus 103 may also be configured to update the map (e.g. via a simultaneous mapping and localization, or SLAM, process).

The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 can be configured to employ the sensors 104 to both navigate among the shelves 110 (e.g. according to the paths mentioned above) and to capture shelf data, such as point cloud and image data, during such navigation.

The server 101 includes a special purpose imaging controller, such as a processor 120, specifically designed to control and/or assist the mobile automation apparatus 103 to navigate the environment and to capture data. The processor 120 can be further configured to obtain the captured data via a communications interface 124 for storage in a repository 132 and subsequent processing (e.g. to detect objects such as shelved products 112 in the captured data, and detect status information corresponding to the objects). The server 101 may also be configured to transmit status notifications (e.g. notifications indicating that products are out-of-stock, low stock or misplaced) to the client device 105 responsive to the determination of product status data. The client device 105 includes one or more controllers (e.g. central processing units (CPUs) and/or field-programmable gate arrays (FPGAs) and the like) configured to process (e.g. to display) notifications received from the server 101.

The processor 120 is interconnected with a non-transitory computer readable storage medium, such as the above-mentioned memory 122, having stored thereon computer readable instructions for performing various functionality, including control of the apparatus 103 to capture shelf data, post-processing of the shelf data, and generating and providing certain navigational data to the apparatus 103, such as target locations at which to capture shelf data. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include an object detection application 128 (also referred to herein as the application 128), which may also be implemented as a suite of logically distinct applications. In general, via execution of the application 128 or subcomponents thereof and in conjunction with the other components of the server 101, the processor 120 is configured to implement various functionality related to obtaining captured data from the apparatus 103 and performing various post-processing operations on the captured data. In the present example, as discussed below in greater detail, execution of the application 128 configures the server 101 to detect objects (e.g. the products 112) on the shelves 110 from point cloud data, such as a point cloud generated from data captured by the apparatus 103.

The processor 120, as configured via the execution of the control application 128, is also referred to herein as the above-mentioned imaging controller 120. As will now be apparent, some or all of the functionality implemented by the controller 120 described below may also be performed by preconfigured special purpose hardware controllers (e.g. one or more FPGAs and/or Application-Specific Integrated Circuits (ASICs) having logic circuit arrangements configured to enhance the processing speed of imaging computations) rather than by execution of the application 128 by the processor 120.

Figure 2A:
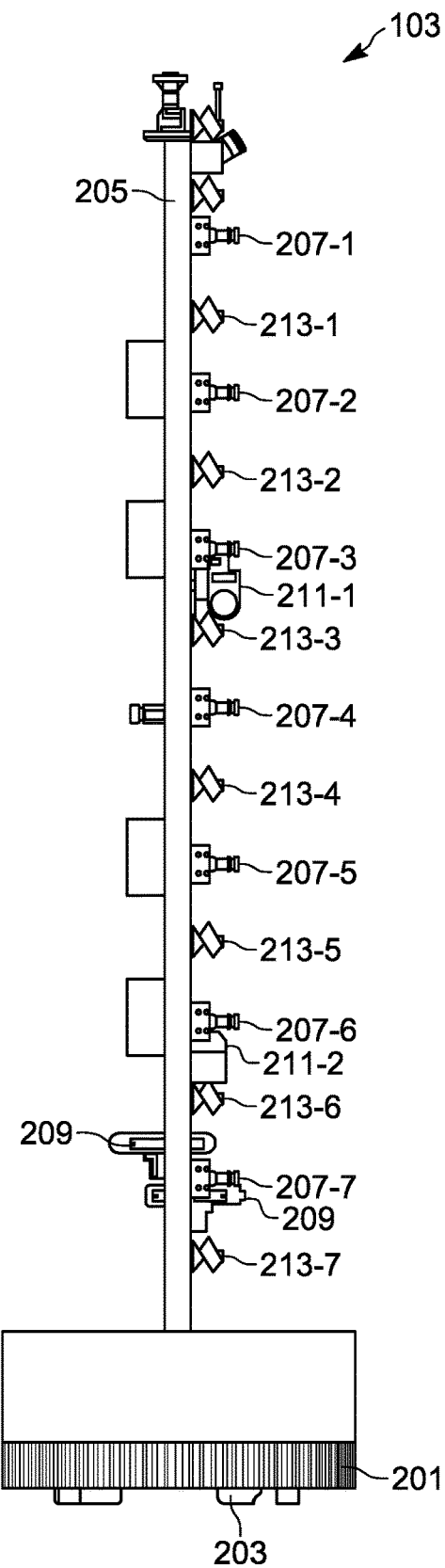
FIG. 2A depicts a mobile automation apparatus in the system of FIG. 1.
Figure 2B:
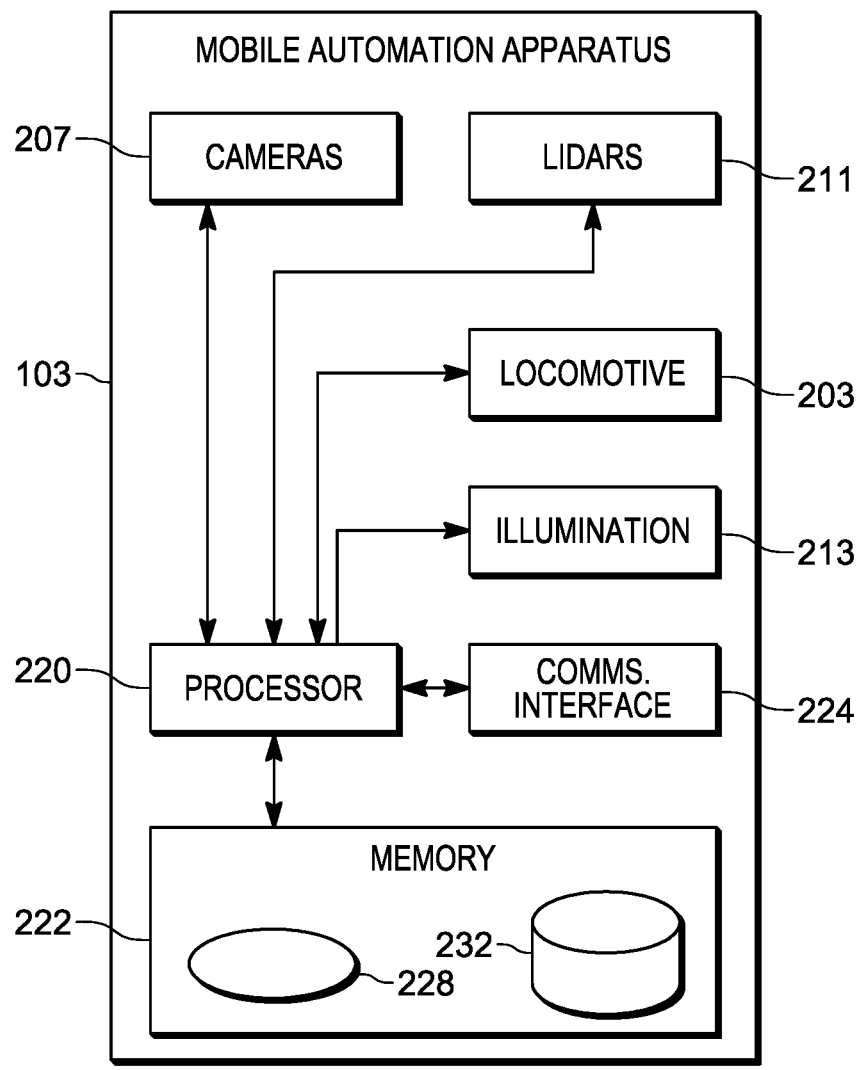
FIG. 2B is a block diagram of certain internal hardware components of the mobile automation apparatus in the system of FIG. 1.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth sensor 209, such as a 3D digital camera. The apparatus 103 also includes additional depth sensors, such as LIDAR sensors 211. In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is travelling. The apparatus 103 is configured to track a location of the apparatus 103 (e.g. a location of the center of the chassis 201) in the common frame of reference 102 previously established in the retail facility, permitting data captured by the mobile automation apparatus 103 to be registered to the common frame of reference.

The mobile automation apparatus 103 includes a special-purpose controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a control application 228 which, when executed by the processor 220, configures the processor 220 to perform various functions related to the navigation of the apparatus 103 and capture of data for subsequent processing, e.g. by the server 101. In some embodiments, such subsequent processing can be performed by the apparatus 103 itself via execution of the application 228. The application 228 may also be implemented as a suite of distinct applications in other examples.

The processor 220, when so configured by the execution of the application 228, may also be referred to as an imaging controller 220. Those skilled in the art will appreciate that the functionality implemented by the processor 220 via the execution of the application 228 may also be implemented by one or more specially designed hardware and firmware components, such as FPGAs, ASICs and the like having logic circuit arrangements configured to enhance the processing speed of navigational and/or imaging computations in other embodiments.

The memory 222 may also store a repository 232 containing, for example, one or more maps representing the environment in which the apparatus 103 operates, for use during the execution of the application 228. The apparatus 103 may communicate with the server 101, for example to receive instructions to navigate to specified locations and initiate data capture operations, via a communications interface 224 over the link 107 shown in FIG. 1. The communications interface 224 also enables the apparatus 103 to communicate with the server 101 via the dock 108 and the link 109.

As will be apparent in the discussion below, other examples, some or all of the processing performed by the server 101 may be performed by the apparatus 103, and some or all of the processing performed by the apparatus 103 may be performed by the server 101. That is, although in the illustrated example the application 128 resides in the server 101, in other embodiments some or all of the actions described below to detect objects on the shelves 110 from captured data may be performed by the processor 220 of the apparatus 103, either in conjunction with or independently from the processor 120 of the server 101. As those of skill in the art will realize, distribution of such computations between the server 101 and the mobile automation apparatus 103 may depend upon respective processing speeds of the processors 120 and 220, the quality and bandwidth of the link 107, as well as criticality level of the underlying instruction(s).

Figure 3:
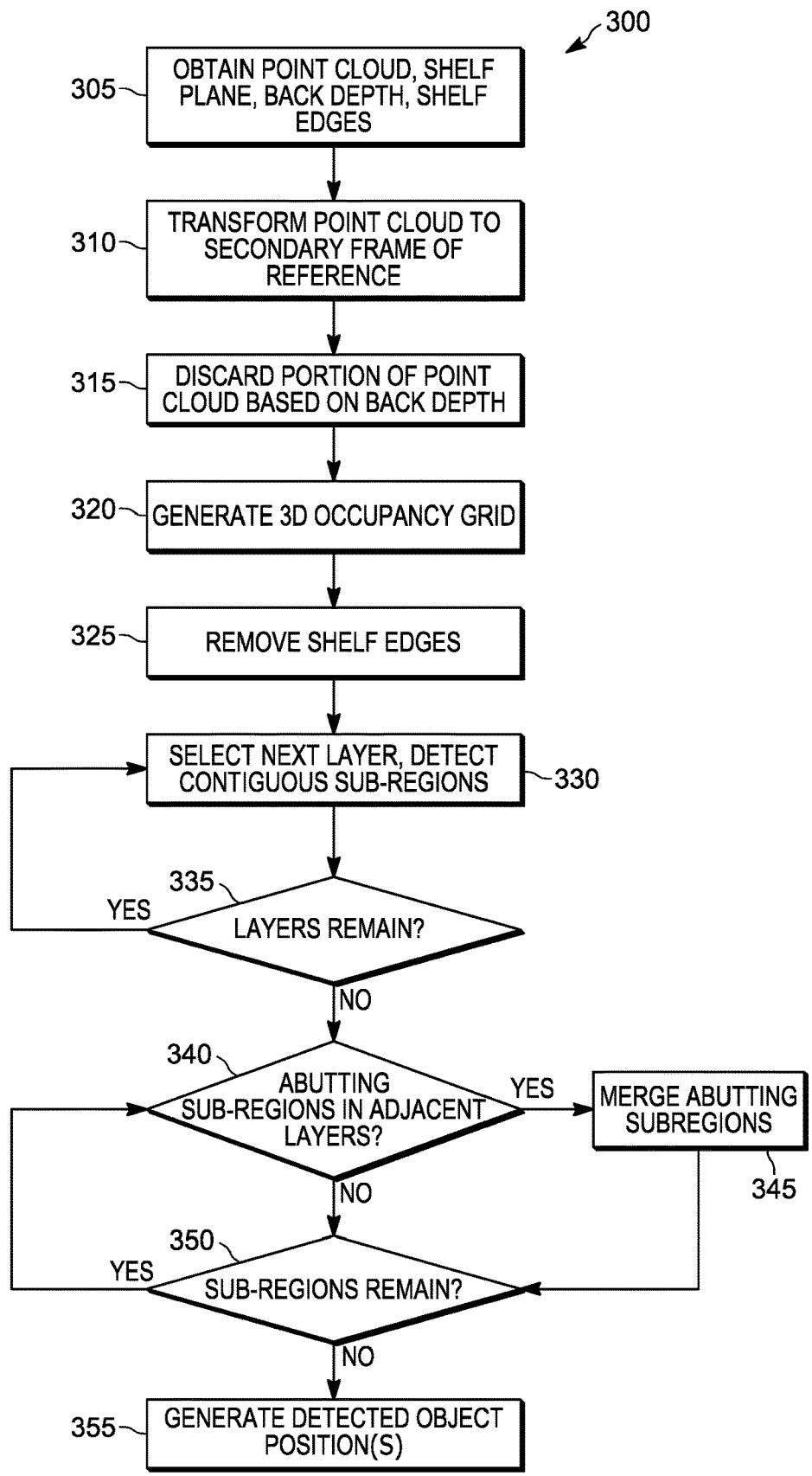
FIG. 3 is a flowchart of a method for detecting objects in a point cloud.

The functionality of the application 128 will now be described in greater detail. In particular, the detection of objects on the shelves 110 (or other suitable support structures) will be described as performed by the server 101. Turning to FIG. 3, a method 300 of detecting objects is shown. The method 300 will be described in conjunction with its performance by the server 101, with reference to the components illustrated in FIG. 1.

At block 305, the server 101 is configured to obtain a point cloud of the support structure, as well as a plane definition corresponding to the front of the support structure. In the present example, in which the support structures are shelves such as the shelves 110 shown in FIG. 1, the point cloud obtained at block 305 therefore represents at least a portion of a shelf module 110 (and may represent a plurality of shelf modules 110), and the plane definition corresponds to a shelf plane that corresponds to the front of the shelf modules 110. In other words, the plane definition defines a plane that contains the shelf edges 118.

The point cloud and plane definition obtained at block 305 can be retrieved from the repository 132. For example, the server 101 may have previously received captured data from the apparatus 103 including a plurality of lidar scans of the shelf modules 110, and generated a point cloud from the lidar scans. Each point in the point cloud represents a point on a surface of the shelves 110, products 112, and the like (e.g. a point that the scan line of a lidar sensor 211 impacted), and is defined by a set of coordinates (X, Y and Z) in the frame of reference 102. The plane definition may also be previously generated by the server 101 and stored in the repository 132, for example from the above-mentioned point cloud. For example, the server 101 can be configured to process the point cloud, the raw lidar data, image data captured by the cameras 207, or a combination thereof, to identify shelf edges 118 according to predefined characteristics of the shelf edges 118. Examples of such characteristics include that the shelf edges 118 are likely to be substantially planar, and are also likely to be closer to the apparatus 103 as the apparatus 103 travels the length 119 of a shelf module 110) than other objects (such as the shelf backs 116 and products 112). The plane definition can be obtained in a variety of suitable formats, such as a suitable set of parameters defining the plane. An example of such parameters includes a normal vector (i.e. a vector defined according to the frame of reference 102 that is perpendicular to the plane) and a displacement (indicating the distance along the normal vector from the origin of the frame of reference 102 to the plane).

At block 305 the server 101 is configured to obtain a depth of the back 116 of the shelf 110, also referred to herein as the shelf depth. The shelf depth may be determined previously at the server 101 and therefore retrieved from the repository 132. The shelf depth can be determined, for example, by processing the point cloud, images of the shelf 110, or a combination thereof, to identify portions of the point cloud that are likely to correspond to the shelf back 116. An example of such processing includes decomposing an image of the shelf 110 into patches, and classifying each patch as depicting the shelf back 116 or not according to a similarity between the patch and a reference image of the shelf back 116. The server 101 can then be configured to identify points in the point cloud that correspond to the patches classified as depicting the shelf back 116, and to average the depth of such points to determine the shelf depth.

Further, at block 305 the server 101 is configured to obtain shelf edge positions. The shelf edge positions can be determined previously by the server (e.g. based on the characteristics noted above), and retrieved from the repository 132 at block 305. Shelf edge positions can be defined as bounding boxes in the frame of reference 102, relative to the plane definition, or the like.

Figure 4A:
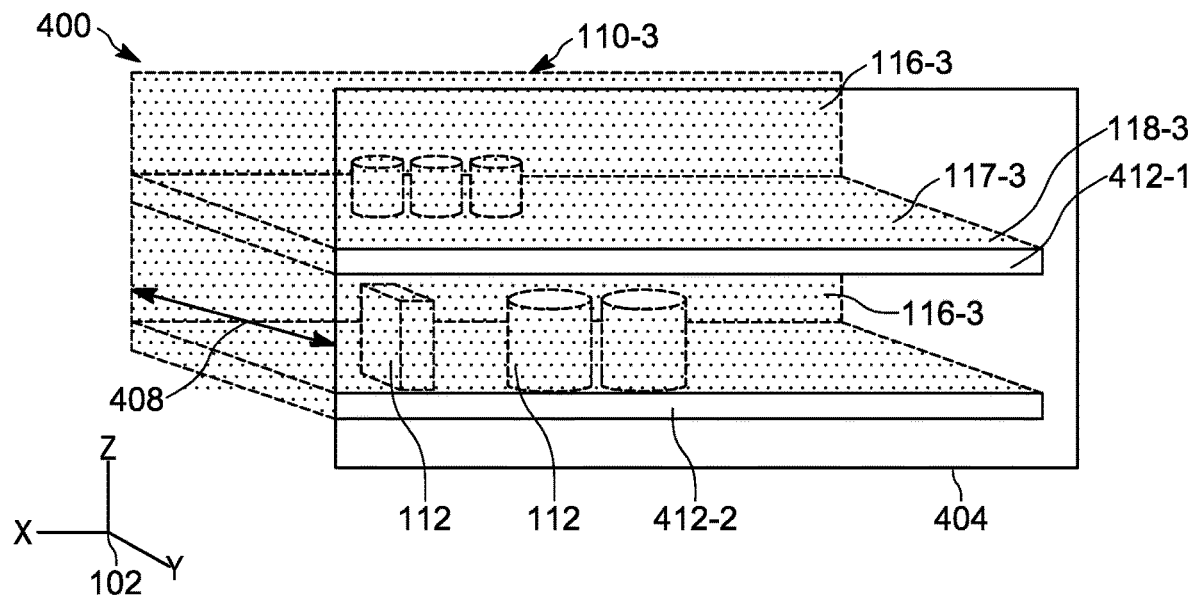
FIG. 4A is a diagram illustrating data obtained at block 305 of the method of FIG. 3.

Referring to FIG. 4A, a point cloud 400 is illustrated, depicting the shelf module 110-3. The shelf back 116-3, the shelf 117-3 and the shelf edge 118-3 are therefore represented in the point cloud 400, as are the products 112. Also shown in FIG. 4A is a plane definition 404 corresponding to the front of the shelf module 110-3 (that is, the plane definition 404 contains the shelf edges 118-3). FIG. 4A also illustrates the remaining inputs obtained at block 305, including a shelf depth 408 and shelf edge positions 412-1 and 412-2 (shown as bounding boxes overlaid on the portions of the point cloud 400 representing shelf edges 118).

The point cloud 400, plane definition 404, shelf depth 408 and shelf edge positions 412 need not be obtained in the graphical forms shown in FIG. 4A. As will be apparent to those skilled in the art, the point cloud may be obtained as a list of coordinates. The plane definition 404 can be obtained as the above-mentioned parameters defining a normal vector and displacement. The shelf depth 408 can be obtained as a scalar quantity, a vector, or the like, and the shelf edge positions 412 can be obtained as sets of coordinates (e.g. in the frame of reference 102) defining the corners of the bounding boxes shown in FIG. 4A.

Figure 4B:
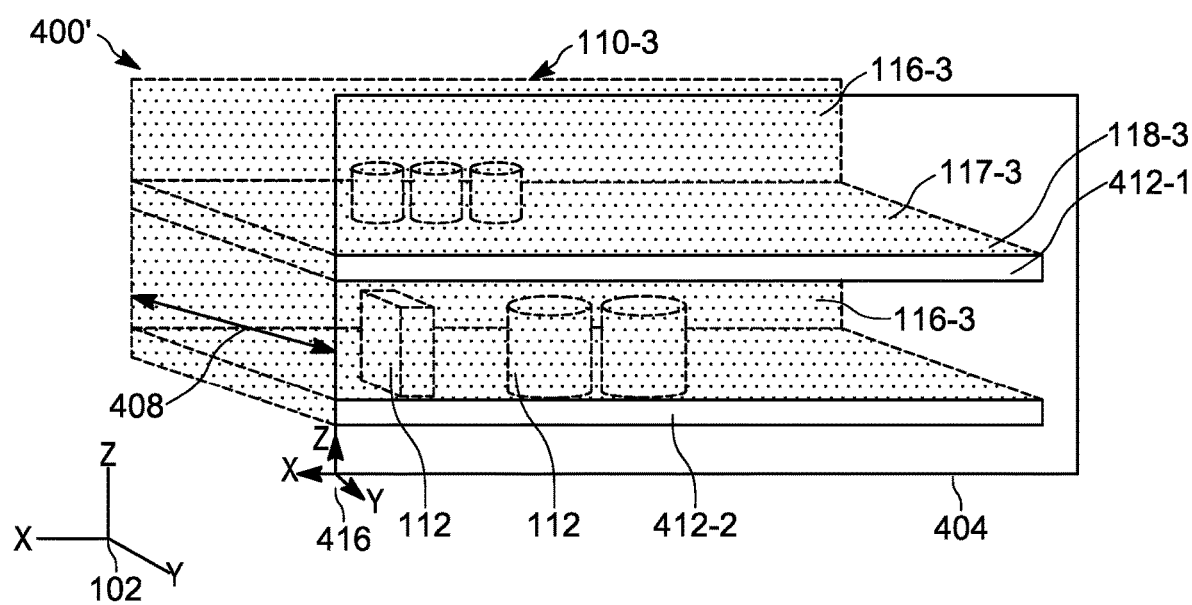
FIG. 4B is a diagram illustrating the transformation of the data obtained at block 305 of the method of FIG. 3 to a secondary frame of reference.

Returning to FIG. 3, at block 310 the server 101 can be configured to transform the point cloud 400 to a secondary frame of reference based on the shelf plane 404. As shown in FIG. 4B, a transformed point cloud 400' in shown, in which the coordinates of each point of the point cloud 400' are expressed in a secondary frame of reference 416. The secondary frame of reference 416 has an origin on the plane 404 and thus, for each point in the point cloud, defines a planar position (in the X and Z dimensions, in the illustrated example) on the shelf plane 404 as well as a depth (in the Y dimension as illustrated) orthogonal to the shelf plane 404. Block 310 may reduce the computational load imposed by the remaining blocks of the method 300. However, in other embodiments, block 310 can be omitted.

Figure 5A:
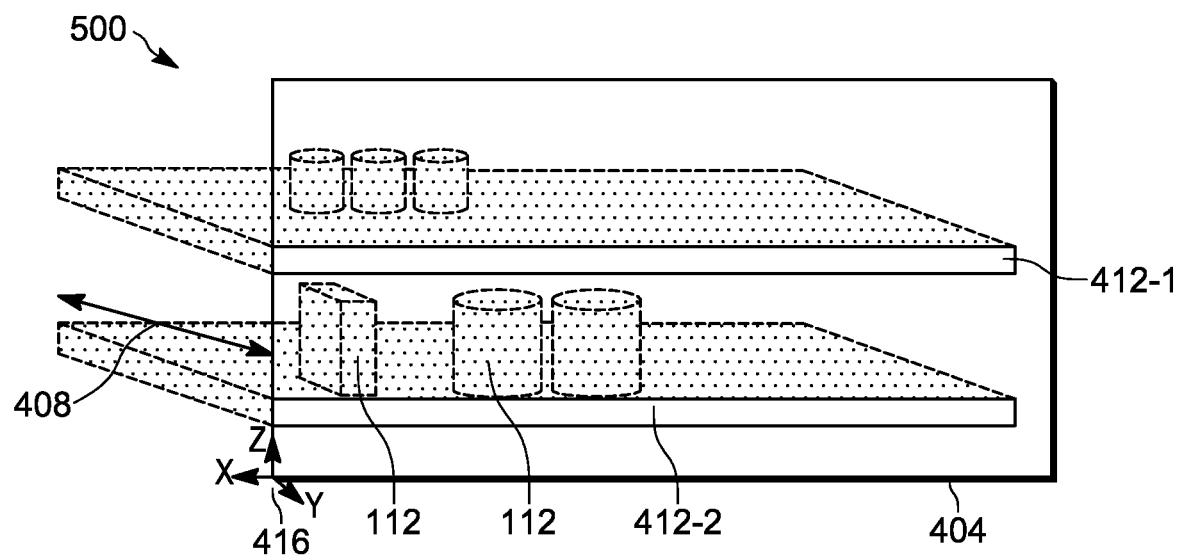
FIG. 5A is a diagram illustrating the removal of a portion of the point cloud at block 315 of the method of FIG. 3

Referring again to FIG. 3, at block 315, the server 101 is configured to discard a portion of the point cloud based on the position of the shelf back 116, as defined by the shelf depth 408. For example, the server 101 can be configured to discard any points in the point cloud with depths equal to or greater than the shelf depth 408. In other examples the server 101 is configured to discard any points in the point cloud with depths that are within a threshold (e.g. 10% below or above the shelf depth 408) of the shelf depth 408. Turning briefly to FIG. 5A, a further modified point cloud 500 is illustrated following the performance of block 310, at which the points corresponding to the shelf back 116-3 were discarded.

Figure 5B:
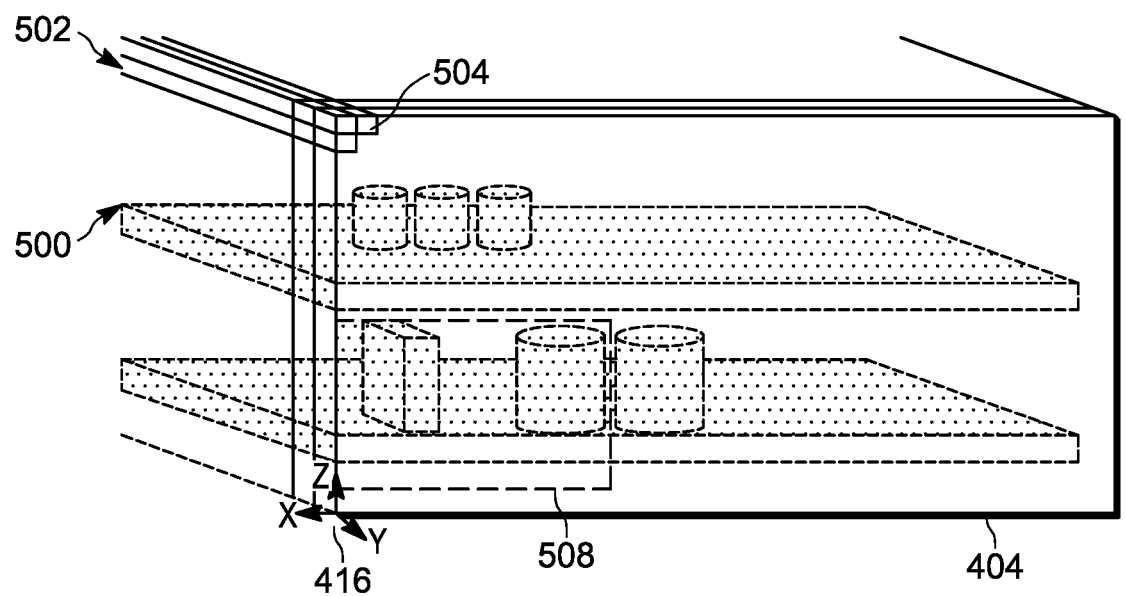
FIGS. 5B and 6A-6B are diagrams illustrating the generation of an occupancy grid at block 320 of the method of FIG. 3.

At block 320, the server 101 is configured to generate a three-dimensional occupancy grid from the point cloud as modified at blocks 305 and 310 (i.e. the point cloud 500, in the present example). The occupancy grid defines a plurality of cells, arranged according to the frame of reference 416. An example grid 502 is shown in FIG. 5B. In particular, the cells 504 of the grid 502 are arranged in depthwise layers or slices, as will be discussed below in greater detail. As also seen in FIG. 5B, in the present example, the cells 504 have a lower resolution than the point cloud 500. That is, each cell 504 represents a larger portion of the shelf module 110-3 than each point in the point cloud. For example, the point cloud may include points spaced apart by about 2 mm, while each cell 504 may have dimensions of about 2 cm×2 cm×2 cm. As will be apparent to those skilled in the art, a wide variety of other dimensions may also be employed for the point cloud 500 and the cells 504.

The occupancy grid 502 is generated by assigning each point of the point cloud to one of the cells 504 (specifically, to the cell encompassing a volume on the shelf module 110 that contains that point). Each cell 504 is then assigned a value indicating that the cell is either occupied (if any points were assigned to the cell 504) or unoccupied (if no points were assigned to the cell 504). In addition, the server 101 can be configured to store the assignment of points to cells 504, for example in the form of a list of points with a cell identifier corresponding to each point. The generation of the occupancy grid will be described below, for a portion 508 of the point cloud 500, as indicated in FIG. 5B Turning to FIG. 6A, the portion 508 of the point cloud 500 is shown in isolation, along with three layers 600-1, 600-2 and 600-3 of the grid 502. To generate the first layer 600-1, the server 101 is configured to determine, for each cell 504 in the layer 600-1, whether the cell 504 contains any points from the point cloud 500. Thus, an example cell 504a is assigned an occupied value (e.g. a value of one) because the cell 504a contains points corresponding to a product 112. Another example cell 504b, on the other hand, is assigned an unoccupied value because the cell 504b does not contain any points in the point cloud 500 (that is, the volume contained within the cell 504b is empty).

Figure 6A:
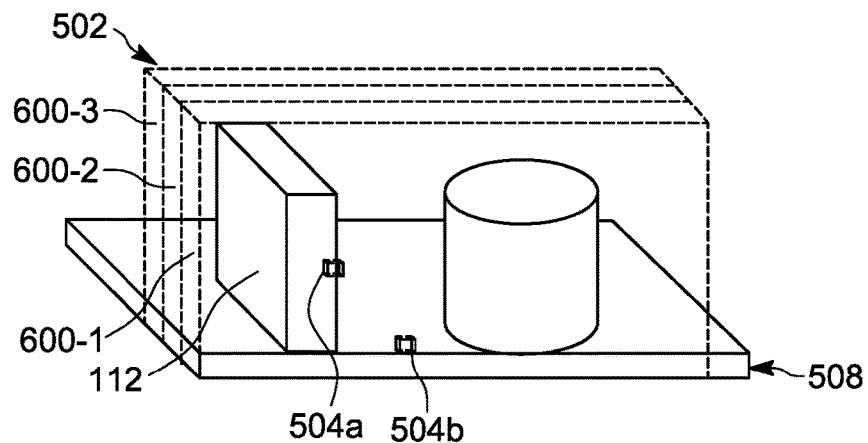
Figure 6B:
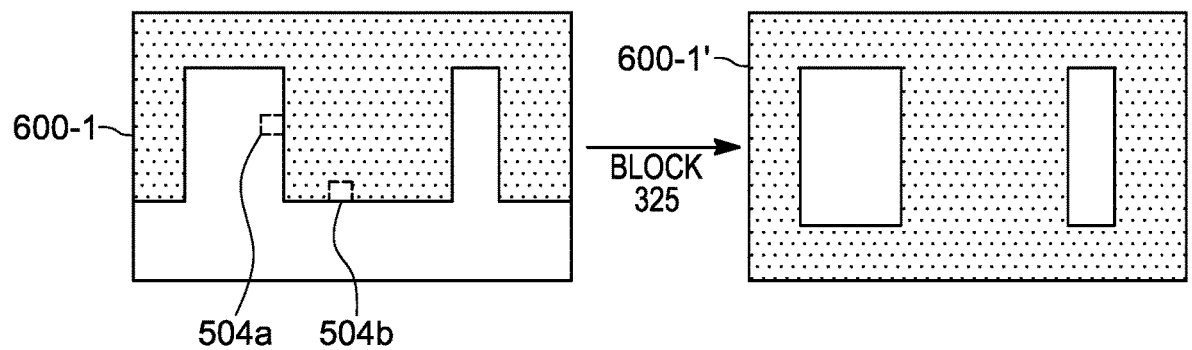
Figure 6B:
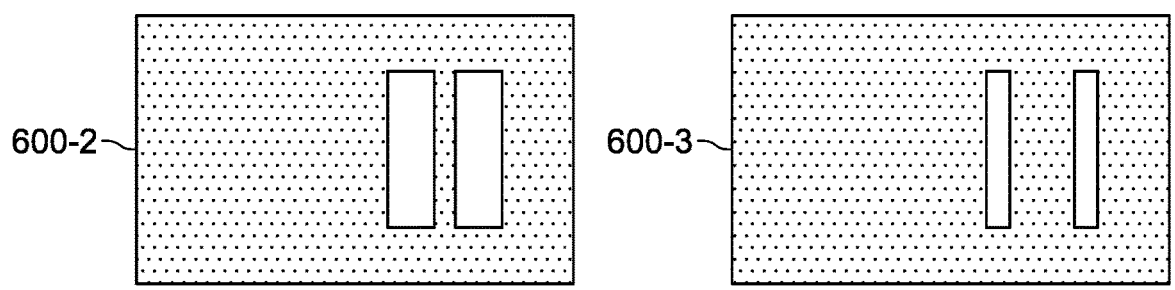

FIG. 6B illustrates, in two dimensions, each layer 600 mentioned above in the grid 502. In particular, in the illustrated example, cells assigned an occupied value are illustrated in white, while cells assigned an unoccupied value are illustrated in black. As will be apparent, other values may also be selected to indicate that a cell is occupied or unoccupied. The cell 504a mentioned in connection with FIG. 6A is occupied, while the cell 504b is unoccupied.

In the present example, the server 101 is configured, upon setting the value of a cell to "occupied", to automatically set the value of every cell with the same planar position (i.e. in the and Z dimension) but a greater depth (in the Y dimension) to unoccupied, whether or not those cells contain points of the point cloud 500. Thus, in the layers 600-2 and 600-3, the cells at the same planar position as the cell 504a but at greater depths are assigned unoccupied values, even though they may contain points corresponding to a product 112. As also seen in FIG. 6B, the layers 600-1, 600-2 and 600-3 each contain occupied cells corresponding to different portions of the cylindrical product 112. Further, the layer 600-1 contains occupied cells that correspond to the shelf edge 118-3.

Returning to FIG. 3, at block 325 the server 101 is configured to discard, e.g. by setting cell values to unoccupied, any cells corresponding to the shelf edge positions 412-1 and 412-2. For example, the server 101 can be configured to identify any cells (e.g. at any depth) having the same planar positions (i.e. in the XZ plane) as the shelf edge positions 412, and to update the values of such cells to unoccupied. Thus, returning to FIG. 6B, the server 101 is configured to update the layer 600-1 of the grid to generate a later 600-1' in which the cells coinciding with the shelf edge position 412-2 are set to unoccupied. Updated versions of the layers 600-2 and 600-3 may also be generated, but their content is identical to the layers 600-2 and 600-3 as shown in FIG. 6B. In other embodiments, the performance of block 325 may be delayed until later in the method 300, as will be discussed below.

Following the performance of block 325, the server 101 is configured to detect contiguous regions in the occupancy grid 502. Each contiguous region so detected corresponds to an object, such as a product 112. In the present example, the server 101 is configured to detect contiguous regions beginning at block 330. At block 330, the server 101 is configured to select a layer of the grid 502 (e.g. the layer closest to the shelf plane 404), and to detect contiguous sub-regions in the selected layer. At block 335, the server 101 is configured to determine whether any layers remain to be processed. When the determination at block 335 is affirmative, the next layer 600 is selected and contiguous sub-regions detected, at block 330. When the determination at block 335 is negative, the performance of the method 300 proceeds to block 340.

Figure 7:
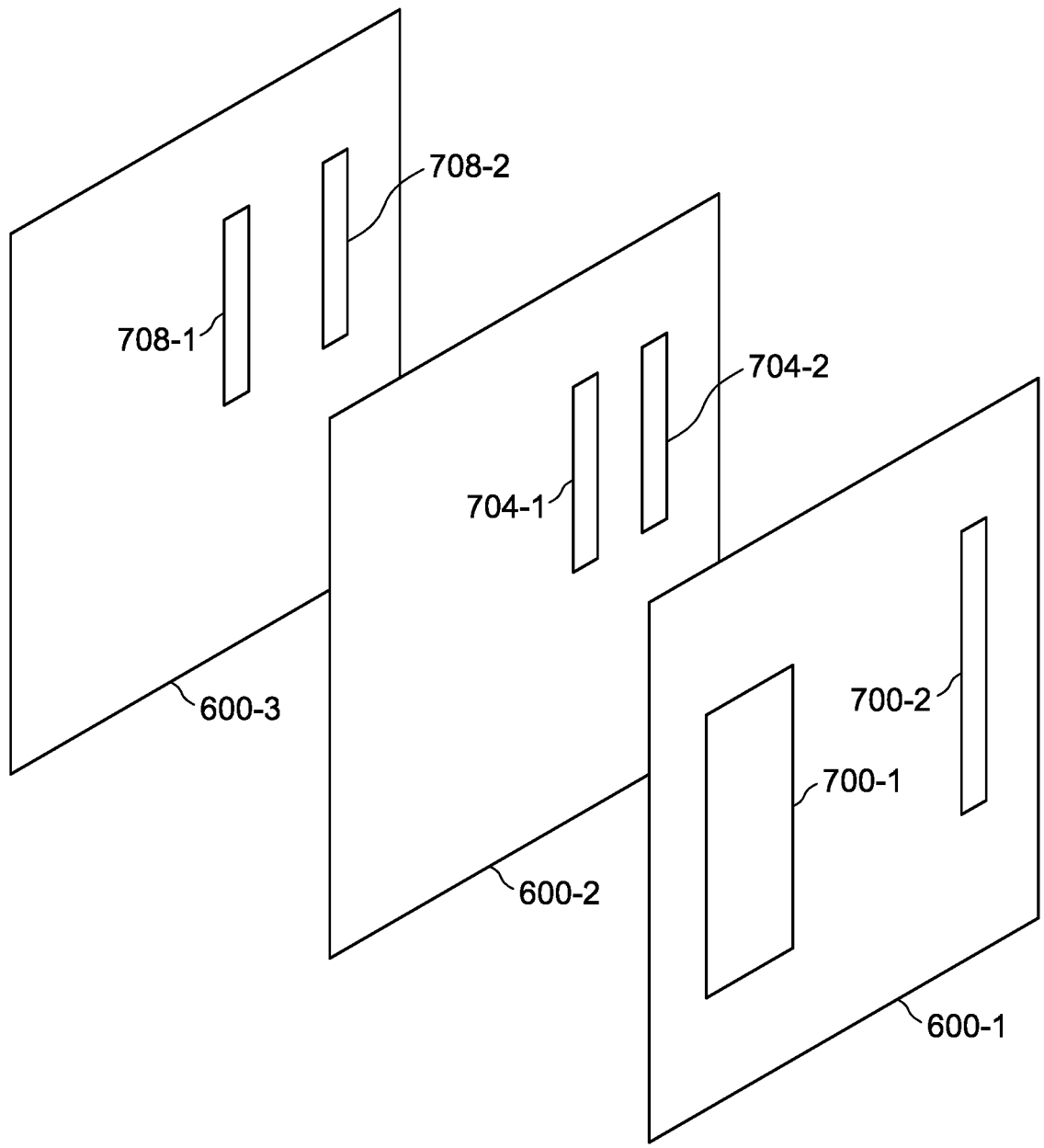
FIG. 7 is a diagram illustrating contiguous sub-regions identified in the occupancy grid at block 330 of the method of FIG. 3.

Referring to FIG. 7, three sets of contiguous sub-regions are illustrated, arising from three performances of block 330 (for each of the layers 600-1, 600-2 and 600-3). In particular, a first set of contiguous sub-regions 700-1 and 700-2 are identified in the layer 600-1. A second set of contiguous sub-regions 704-1 and 704-2 are identified in the layer 600-2, and a third set of contiguous sub-regions 708-1 and 708-2 are identified in the layer 600-3. Identification of contiguous sub-regions 700, 704, 708 and the like can be implemented via a suitable blob extraction (also referred to as connected-component analysis) algorithm. In general, the detection of contiguous sub-regions is configured to detect regions of cells in each layer 600 with the same value. More specifically, in the present example the server 101 is configured to identify regions of cells in each layer 600 with "occupied" values.

At block 340, following a negative determination at block 335, the server 101 is configured to continue the identification of contiguous regions by determining, for each sub-region detected at block 330, whether any adjacent layers 600 (to the layer containing the current sub-region) contain abutting sub-regions. As noted in connection with FIG. 6B and as seen in FIG. 7, certain objects (e.g. the cylindrical product 112 shown in FIG. 6A), particularly those with surfaces that are not parallel to the shelf plane 404, appear segmented between layers 600 of the grid 502, and may therefore be represented by a plurality of sub-regions. In other words, at block 340, the server 101 is configured to determine whether any sub-regions detected through one or more performances of blocks 330-335 correspond to a single object.

Figure 8:
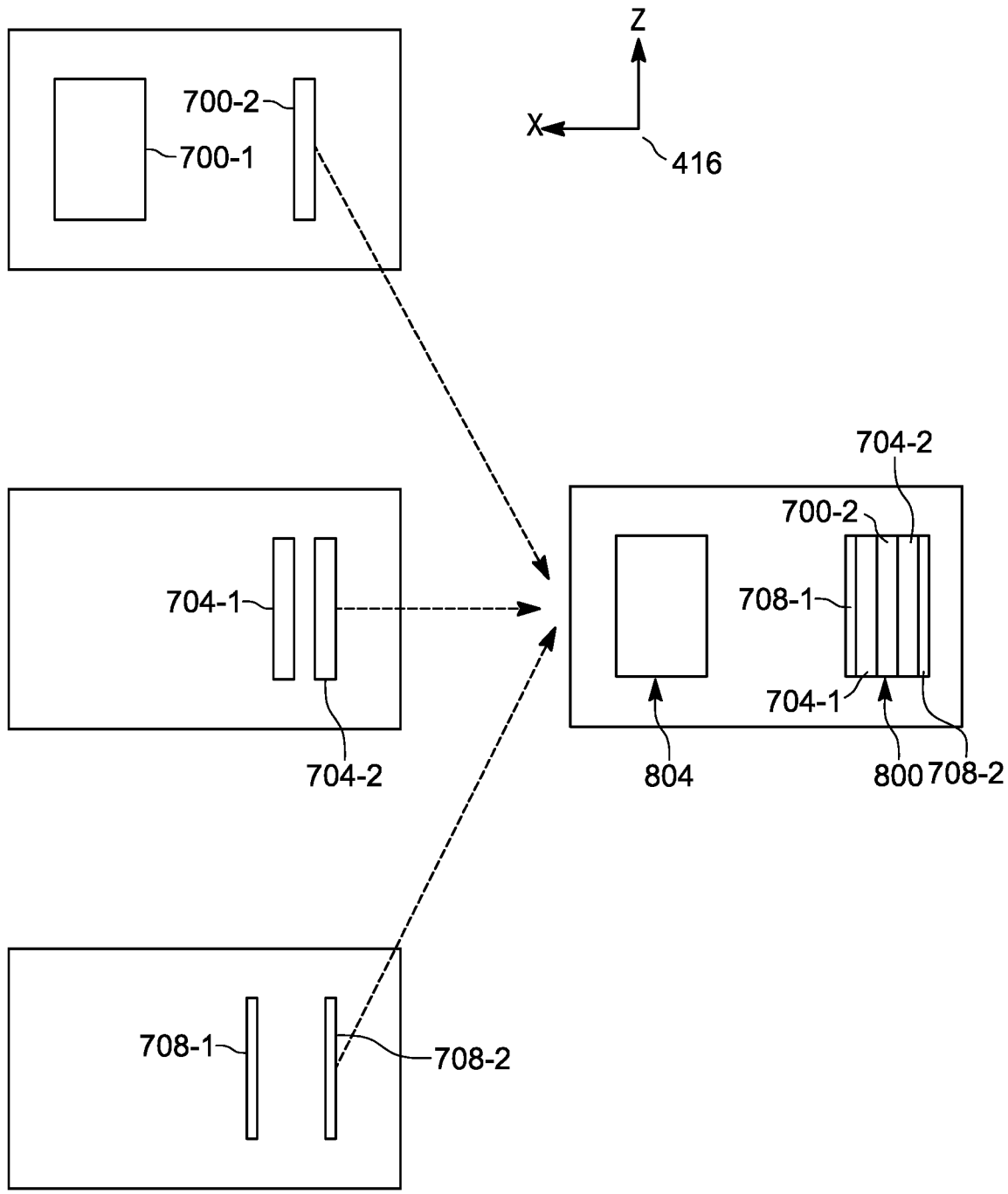
FIGS. 8 and 9A are diagrams illustrating the performance of blocks 340-350 of the method of FIG. 3.

Turning to FIG. 8, the determination at block 340 for a selected sub-region includes determining whether the planar position of the selected sub-region and the planar position of another sub-region in an adjacent layer 600 of the grid 502 abut each other. For example, beginning with the sub-region 700-2, which resides in the layer 600-1, the server 101 is configured to determine whether the sub-region 700-2 shares a boundary in the XZ plane of the frame of reference 416 with a boundary of any sub-region in the layer 600-2 (which is adjacent in depth to the layer 600-1). In the present example, the determination is affirmative for both the sub-regions 704-1 and 704-2 in the layer 600-2. The server 101 is therefore configured, at block 345, to merge the sub-regions 700-2, 704-1 and 704-2, e.g. by assigning a common region identifier to all three sub-regions.

At block 350, the server 101 is configured to determine whether any sub-regions remain to be assessed via a further performance of block 340. In the present example, the determination is affirmative, and block 340 is repeated, for example by selecting the sub-region 700-1. As there are no sub-regions in the layer 600-2 with planar positions abutting the planar position of the sub-region 700-1, the determination at block 340 is negative.

Figure 9A:
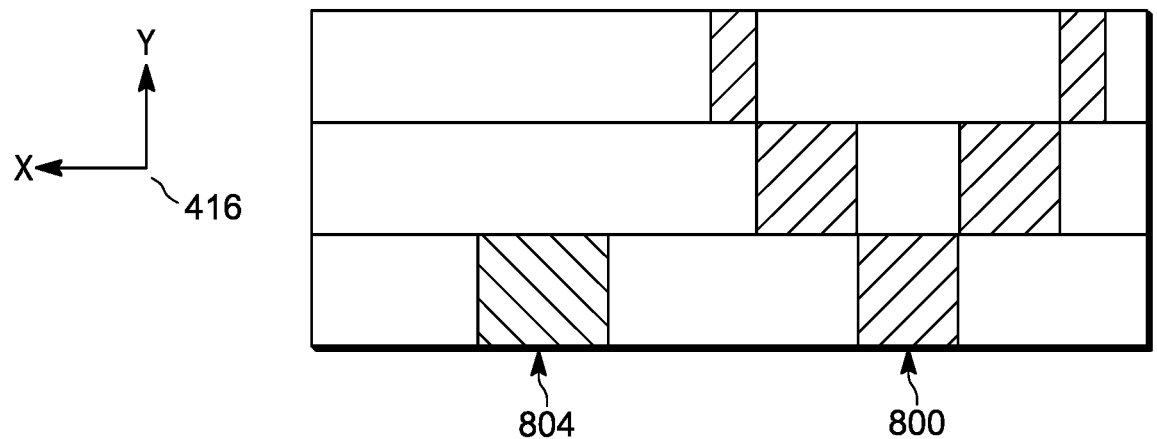

In a further example performance of block 340, the server 101 may be configured to select the sub-region 704-1 of the layer 600-2. As is evident in FIG. 8, the boundary of the sub-region 708-1 (in the layer 600-3) coincides with the boundary of the sub-region 704-1 in the XZ plane. The determination at block 340 is therefore affirmative, and the sub-regions 704-1 and 708-1 are merged (i.e. assigned the same region identifier). As will now be apparent, repeated performances of block 340, 345 and 350 result in the sub-regions 700-2, 704-1, 704-2, 708-1 and 708-2 being merged and assigned one region identifier, and in the sub-region 700-1 assigned another region identifier. In other words, following a negative determination at block 350 (i.e. when all sub-regions have been assessed via block 340), two contiguous regions 800 and 804 have been detected within the grid 502. FIG. 9A illustrates the contiguous regions 800 and 804 in an overhead view.

Figure 9B:
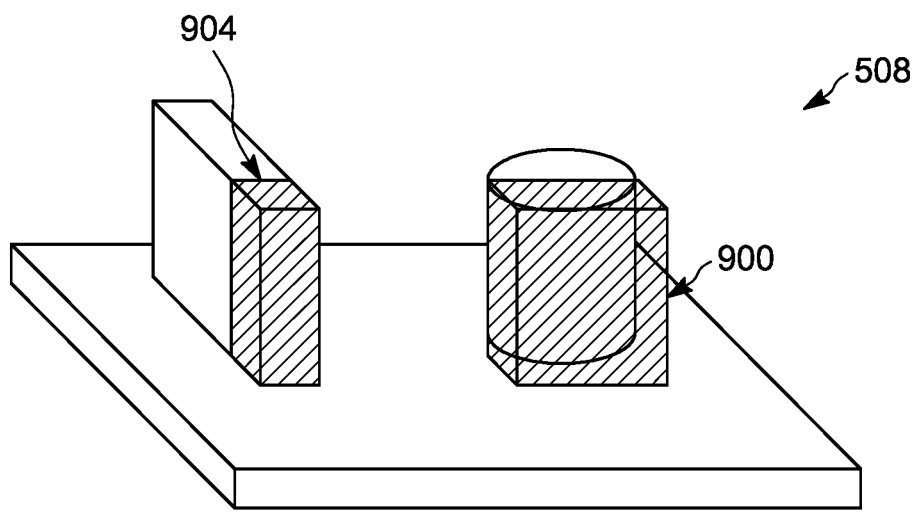
FIG. 9B is a diagram illustrating detected object positions generated at block 355 of the method of FIG. 3.

At block 355, the server 101 is configured to generate detected object positions based on the contiguous regions detected at blocks 330-350. For each detected contiguous region, the server 101 is configured to generate one detected object position. Various forms of object position are contemplated. In the present example, as illustrated in FIG. 9B, the detected object positions are generated as bounding boxes containing the volumes encompassed by the cells of the corresponding contiguous regions. Thus, a first bounding box 900 is generated from the contiguous region 800, and a second bounding box 904 is generated from the contiguous region 804.

In other examples, the detected object positions can be generated as the centroids of each contiguous region (e.g. a single point in the frame of reference 416). In further examples, the above-mentioned bounding boxes can be generated based on the point cloud 500 rather than based directly on the contiguous regions 800 and 804. For example, as noted above, the allocation of points to the cells of the occupancy grid 502 can be stored in the memory 122. At block 355, for each contiguous region the points associated with the cells of that contiguous region are retrieved from the memory 122 and a bounding box is fitted to the retrieved cells.

The detected object positions generated at block 355 can be stored in the memory 122 (e.g. in the repository 132), and can also be transmitted to a further computing device such as the client device 105, e.g. for presentation on a display thereof. The detected object positions generated at block 355 may also be employed by the server 101 itself or by another computing device for the detection of gaps between products 112. For example, the server 101 can be configured to retrieve label positions on the shelf edges 118, indicating the expected position for products 112, and to determine whether a detected object position was generated in association with each label position (e.g. above each label position, indicating the presence of a product 112 above the corresponding label). Any label positions without corresponding detected object positions may be detected as gaps (e.g. out of stock products 112) by the server 101.

Variations to the above systems and methods are contemplated. For example, as noted earlier, in some embodiments, block 325 may be performed following a negative determination at block 335 (i.e. between blocks 335 and 340). In such embodiments, the presence of occupied cells corresponding to shelf edges may lead to the detection of a single contiguous sub-region that in fact corresponds to distinct objects as a result of the shelf edge extending between the portions of the sub-region corresponding to each object. Responsive to discarding cells corresponding to the shelf edges 118, the server 101 may therefore be configured to relabel remaining sub-regions where such sub-regions have been separated (i.e. are no longer contiguous).

Figure 10:
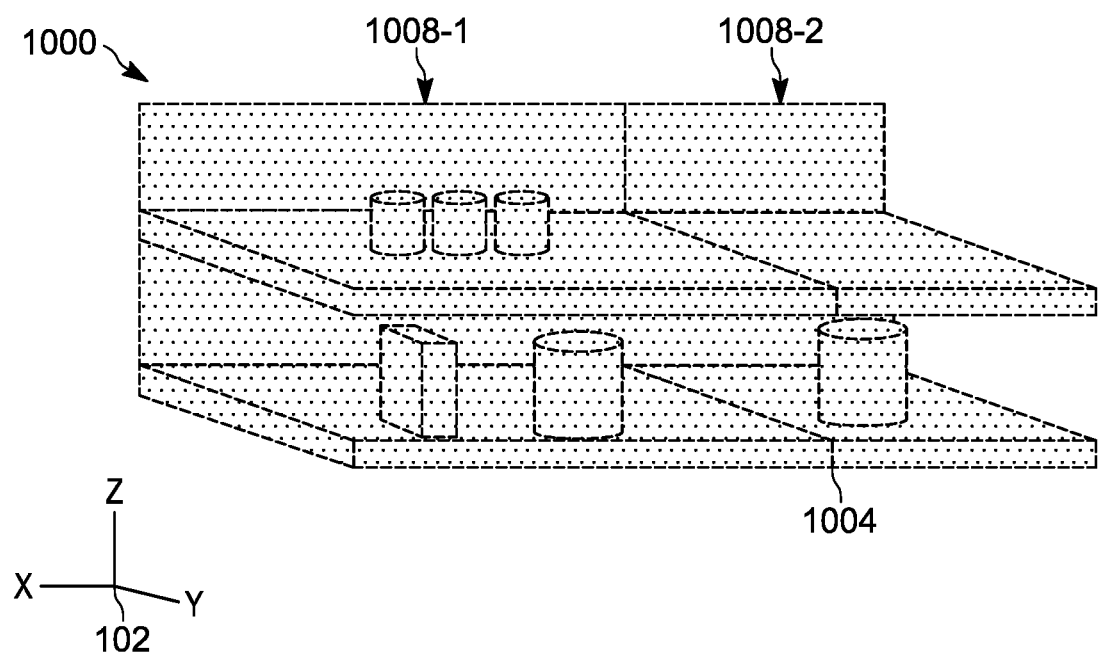
FIG. 10 is a diagram illustrating the segmentation of a point cloud prior to object detection.

In further embodiments, the server 101 can be configured, prior to the performance of block 310, to segment the point cloud obtained at block 305. Specifically, referring to FIG. 10, an example point cloud 1000 obtained at block 305 is shown. The point cloud 1000 represents two distinct shelf modules, separated by a module boundary 1004. The server 101 can be configured, in such embodiments, to retrieve module boundary positions (e.g. in the frame of reference 102) from the repository 132, or to detect the module boundary 1004, for example via image gradients or the like, and to segment the point cloud 1000 into first and second segments 1008-1 and 1008-2. The server 101 can then be configured to perform the remainder of the method 300 separately for each segment 1008.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of detecting objects on a support structure, the method comprising:
   obtaining a point cloud of the support structure supporting an object;
   obtaining a position of a back of the support structure in the point cloud by obtaining a plane definition corresponding to a front of the support structure;
   discarding a portion of the point cloud based on the position of the back of the support structure;
   generating a three-dimensional occupancy grid from the point cloud, the occupancy grid having a plurality of cells each indicating whether the cell is one of occupied and unoccupied, wherein generating the three-dimensional occupancy grid comprises, for each position on the plane definition: (a) determining a first depth of a point nearest to the plane definition, and (b) storing, in a cell of the occupancy grid containing the point, an occupied indicator and storing, in each cell of the occupancy grid having the position on the plane definition and a greater depth than the first depth, an unoccupied indicator;
   identifying a contiguous region of occupied cells in the occupancy grid corresponding to the object; and
   generating a detected object position based on the contiguous region.

2. The method of claim 1, wherein the detected object position comprises a bounding box.

3. The method of claim 1, wherein obtaining the position of the back of the support structure further includes obtaining a depth from the plane definition to the back of the support structure.

4. The method of claim 3, wherein discarding the portion of the point cloud based on the position of the back of the support structure includes discarding points within a threshold depth matching the depth from the plane definition to the back of the support structure.

5. The method of claim 3, wherein the point cloud defines a plurality of points according to a common frame of reference; the method further comprising:
   before discarding the portion, transforming the points from the common frame of reference to a secondary frame of reference defining, for each point, a position on the plane definition and a depth orthogonal to the plane definition.

6. The method of claim 1, wherein identifying the contiguous region comprises:

in a first set of cells having a first common depth, identifying a first contiguous sub-region;
   in a second set of cells having a second common depth, identifying a second contiguous sub-region;
   determining whether to merge the first and second contiguous sub-regions; and
   when the determination is affirmative, merging the first and second contiguous sub-regions to generate the contiguous region.

7. The method of claim 6, wherein determining whether to merge the first and second contiguous sub-regions comprises: determining whether a first position on the plane definition of the first contiguous sub-region abuts a second position on the plane definition of the second contiguous sub-region.

8. The method of claim 1, further comprising:
   prior to identifying the contiguous region, discarding a portion of the cells corresponding to support structure edge positions.

9. A computing device for detecting objects on a support structure, comprising:
   a memory storing (i) a point cloud of the support structure supporting an object, and (ii) a position of a back of the support structure in the point cloud;
   an imaging controller connected to the memory, the imaging controller configured to:
   retrieve, from the memory, the point cloud;
   obtain the position of the back of the support structure in the point cloud by retrieving from the memory a plane definition corresponding to a front of the support structure;
   discard a portion of the point cloud based on the position of the back of the support structure;
   generate a three-dimensional occupancy grid from the point cloud, the occupancy grid having a plurality of cells each indicating whether the cell is one of occupied and unoccupied, wherein the imaging controller is further configured to generate the occupancy grid by, for each position on the plane definition: (a) determining a first depth of a point nearest to the plane definition, and (b) storing, in a cell of the occupancy grid containing the point, an occupied indicator and storing, in each cell of the occupancy grid having the position on the plane definition and a greater depth than the first depth, an unoccupied indicator;
   identify a contiguous region of occupied cells in the occupancy grid corresponding to the object; and
   generate a detected object position based on the contiguous region.

10. The computing device of claim 9, wherein the detected object position comprises a bounding box.

11. The computing device of claim 9, wherein the imaging controller is further configured, to obtain the position of the back of the support structure, to:
    retrieve from the memory a depth from the plane definition to the back of the support structure.

12. The computing device of claim 11, wherein the imaging controller is further configured, to discard the portion of the point cloud based on the position of the back of the support structure, to: discard points within a threshold depth matching the depth from the plane definition to the back of the support structure.

13. The computing device of claim 11, wherein the point cloud defines a plurality of points according to a common frame of reference; and wherein the imaging controller is further configured to:

before discarding the portion, transform the points from the common frame of reference to a secondary frame of reference defining, for each point, a position on the plane definition and a depth orthogonal to the plane definition.

14. The computing device of claim 9, wherein the imaging controller is further configured, to identify the contiguous region, to:
in a first set of cells having a first common depth, identify a first contiguous sub-region;
in a second set of cells having a second common depth, identify a second contiguous sub-region;
determine whether to merge the first and second contiguous sub-regions; and
when the determination is affirmative, merge the first and second contiguous sub-regions to generate the contiguous region.

15. The computing device of claim 14, wherein the imaging controller is further configured, to determine whether to merge the first and second contiguous sub-regions, to:
determine whether a first position on the plane definition of the first contiguous sub-region abuts a second position on the plane definition of the second contiguous sub-region.

16. The computing device of claim 9, wherein the imaging controller is further configured to:
prior to identifying the contiguous region, discard a portion of the cells corresponding to support structure edge positions.

17. A non-transitory computer-readable medium storing a plurality of computer-readable instructions executable by a processor of a computing device, wherein execution of the instructions configures the computing device to:
obtain a point cloud of a support structure supporting an object;
obtain a position of a back of the support structure in the point cloud by obtaining a plane definition corresponding to a front of the support structure;
discard a portion of the point cloud based on the position of the back of the support structure;
generate a three-dimensional occupancy grid from the point cloud, the occupancy grid having a plurality of cells each indicating whether the cell is one of occupied and unoccupied, wherein the occupancy grid is generated by, for each position on the plane definition: (a) determining a first depth of a point nearest to the plane definition, and (b) storing, in a cell of the occupancy grid containing the point, an occupied indicator and storing, in each cell of the occupancy grid having the position on the plane definition and a greater depth than the first depth, an unoccupied indicator;
identify a contiguous region of occupied cells in the occupancy grid corresponding to the object; and
generate a detected object position based on the contiguous region.

18. The non-transitory computer-readable medium of claim 17, wherein the detected object position comprises a bounding box.

* * * * *